J. C. WHITE.
GASKET.
APPLICATION FILED MAR. 2, 1908.
906,761.
Patented Dec. 15, 1908.
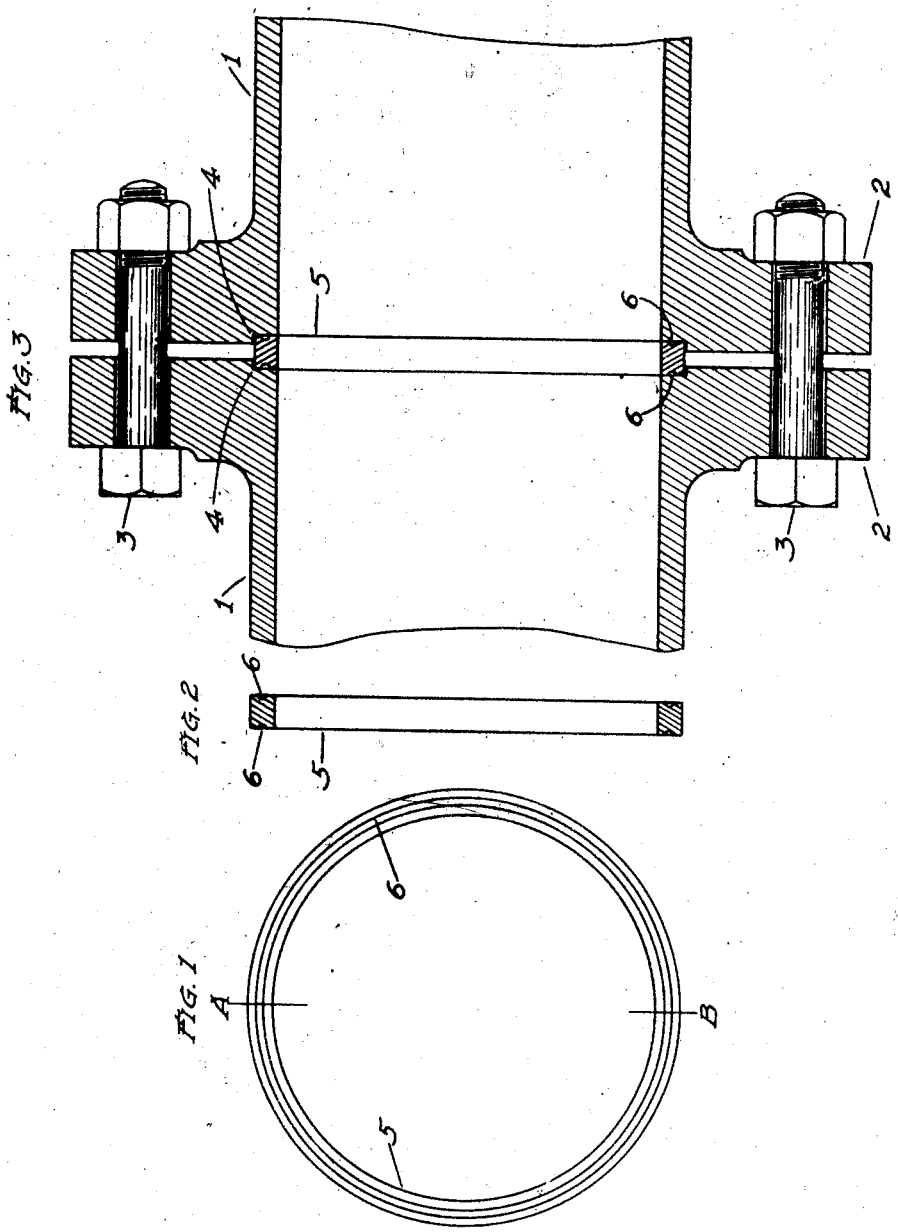
WITNESSES
INVENTOR

UNITED STATES PATENT OFFICE.

JOHN C. WHITE, OF MADISON, WISCONSIN.

GASKET.

No. 906,761.

Specification of Letters Patent.

Patented Dec. 15, 1908.

Application filed March 2, 1908. Serial No. 418,858.

*To all whom it may concern:*

Be it known that I, JOHN C. WHITE, of the city of Madison, county of Dane, and State of Wisconsin, have invented a certain new and Improved Gasket, of which the following is a specification.

The object of this invention is to provide improved and reliable means of making joints between the flanges of pipes and fittings used for the transmission of fluids under high pressures and temperatures.

The invention is exemplified in the device hereinafter described and it is defined in the appended claim.

In the drawings forming part of this specification, Figure 1 is an elevation of one form of the device and Fig. 2 is a section of Fig. 1 on line A. B. Fig. 3 is a section of pipes and flanges showing the gasket, Fig. 1, in place.

In Fig. 3, 1, 1, are pipes: 2, 2, are flanges, formed, welded or attached by other suitable means to pipes 1, 1: 3, 3, are bolts for bolting flanges 2, 2, together: 4, 4, are recesses formed in the flanges 2, 2, and pipes 1, 1, the purpose of which is to hold the parts truly central with each other in assembling: 5 is the gasket, Fig. 1, made of metal and preferably formed by cutting short sections or rings of the tubing of which pipes 1, 1, are made, the object being to secure a firm, strong gasket having an expansion ratio and ductility as nearly as possible the same as that of the connecting pipes. The grooves or recesses 6, 6, formed in the sides of gasket 5, are for the purpose of reducing the surface areas in contact so that a high unit pressure, sufficient to cause the metal of the gasket and pipes to flow and fill all irregularities and crevices, may be secured by the tension set up in the bolts 3, 3.

The essential elements of the device are:—
1. That it be made of a metal having the same physical properties as the material of the connecting pipes, so that better contact at the joints, due to the flowing and interlocking of the molecules of the material, may be secured and that said contact may be disturbed as little as possible by the expansion and contraction due to changes of temperature and pressure. 2. That its dimensions be such as will give it strength equal to that of the connecting pipes in resisting internal pressure. 3. That its form be such that a joint is made as nearly as possible at the inner diameter of the pipes, so that a smooth continuous passage is formed and pockets or depressions for the collection of liquids and sediment are avoided, and that its area of surface contact be reduced, if necessary, by the removal of part of the metal of the body of the gasket so as to leave one or more annular seats or bearings slightly raised above the body of the gasket and on which the pressure due to the tension of the bolts is concentrated.

The device is distinguished from the other metal gaskets now in use, in that it is made of a material having, as nearly as possible, the same physical properties as that of which the connecting pipes are made, and in depending, for its absolute contact at the joints, on the flowing of the metal of both the gasket and the pipes or flanges and not on the flowing or flexure of the metal of the gasket only. No grinding, scraping or special preparation of the surfaces is required, a plain machine finish being sufficient.

What I do claim as my invention and desire to secure by Letters Patent, is:—

A gasket made of solid metal, having, as nearly as possible, the same physical properties as that of which the connecting pipes are made, its inner and outer diameters the same as those of the connecting pipes, and having its area of surface contact so restricted that a high unit pressure on the gasket can be secured substantially as described.

In testimony whereof I sign my name in the presence of two subscribing witnesses.

JNO. C. WHITE.

Witnesses:
WINIFRED L. TIMLIN,
SPENCER A. PROSE.